(12) United States Patent
Eisenkrämer

(10) Patent No.: US 7,274,505 B2
(45) Date of Patent: Sep. 25, 2007

(54) INSPECTION MICROSCOPE FOR SEVERAL WAVELENGTH RANGES AND REFLECTION REDUCING LAYER FOR AN INSPECTION MICROSCOPE FOR SEVERAL WAVELENGTH RANGES

(75) Inventor: Frank Eisenkrämer, Biebertal (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 30 days.

(21) Appl. No.: 10/475,653

(22) PCT Filed: Mar. 22, 2002

(86) PCT No.: PCT/EP02/03217

§ 371 (c)(1),
(2), (4) Date: Oct. 23, 2003

(87) PCT Pub. No.: WO02/086579

PCT Pub. Date: Oct. 31, 2002

(65) Prior Publication Data

US 2004/0145803 A1 Jul. 29, 2004

(30) Foreign Application Priority Data

Apr. 23, 2001 (DE) .................. 101 19 909

(51) Int. Cl.
G02B 5/20 (2006.01)

(52) U.S. Cl. .............. 359/359; 359/368; 359/586; 359/588

(58) Field of Classification Search ................ 359/359, 359/350, 355, 360, 361, 368, 577, 580, 581, 359/583, 584, 585, 586, 588, 589, 590
See application file for complete search history.

(56) References Cited

U.S. PATENT DOCUMENTS 3,936,136 A * 2/1976 Ikeda et al. ............... 359/359

(Continued)

FOREIGN PATENT DOCUMENTS

DE 198 31 392 A1 2/2000

(Continued)

OTHER PUBLICATIONS

"Light für die nächsten Chipgenerationen" ("Light for the Next Chip Generation"), Fraunhofer Magazin, Mar. 2001, pp. 8-12.

(Continued)

Primary Examiner—Arnel Lavarias
(74) Attorney, Agent, or Firm—Foley & Lardner LLP (57) ABSTRACT

An inspection microscope for several wavelength ranges with at least one illuminating beam path and at least one imaging beam path. Those optical elements in the illuminating beam path and in the imaging beam path, through which beams of all wavelengths pass, are provided with a reflection-reducing layer, by means of which the wavelength ranges with reduced reflection are the visible VIS-wavelength range up to 650 nm, the i-lines at $\lambda=365$ nm and the ultraviolet DUV-wavelength range from 240 nm to 270 nm. The reflection-reducing layer is a sandwich structure, comprising various material combinations, such as for example, $M2/MgF_2$ or $M2/MgF_2/SiO_2$ or $M2/MgF_2/Al_2O_3$, where M2 is a mixed substance from the company Merck, comprising $Al_2O_3$. The optical components with reduced reflectance preferably comprise quartz glass or $CaF_2$.

22 Claims, 9 Drawing Sheets

U.S. PATENT DOCUMENTS

| | | | |
|---|---|---|---|
| 4,960,310 A | 10/1990 | Cushing | |
| 5,415,946 A * | 5/1995 | Friz | 428/697 |
| 5,481,401 A * | 1/1996 | Kita et al. | 359/353 |
| 5,557,466 A * | 9/1996 | Otani et al. | 359/586 |
| 5,661,596 A * | 8/1997 | Biro et al. | 359/359 |
| 5,879,820 A * | 3/1999 | Quesnel et al. | 428/688 |
| 5,911,858 A | 6/1999 | Ruffner | |
| 6,396,626 B1 * | 5/2002 | Otani et al. | 359/359 |
| 6,819,498 B1 * | 11/2004 | Watanabe et al. | 359/656 |
| 6,863,397 B2 * | 3/2005 | Nakano | 351/163 |

FOREIGN PATENT DOCUMENTS

| | | |
|---|---|---|
| DE | 199 31 954 A1 | 1/2001 |
| EP | 1 069 449 A2 | 1/2001 |
| JP | 2000-227504 A | 8/2000 |
| WO | WO 00/03957 A2 | 1/2000 |

OTHER PUBLICATIONS

"Förderprogramm Optische Technologien" ("Promoting Program Optical Technologies"), Bundesministerium für Bildung und Forschung (BMBF), Sep. 2002, pp. 14-15.

PhotonicNet Infoletter, Jan. 2003, pp. 1-5.

* cited by examiner

INSPECTION MICROSCOPE FOR SEVERAL WAVELENGTH RANGES AND REFLECTION REDUCING LAYER FOR AN INSPECTION MICROSCOPE FOR SEVERAL WAVELENGTH RANGES

BACKGROUND OF THE INVENTION

The application relates to an inspection microscope for a plurality of wavelength regions having at least one illumination beam path and at least one imaging beam path.

The invention also relates to a reflection-reducing layer for an inspection microscope for a plurality of wavelength regions.

In the semiconductor industry, inspection microscopes are used to observe, examine and test wafers, masks and semiconductor modules for monitoring the various fabrication steps. Inspection microscopes are generally substantially automated. They include, inter alia, automatic conveying and handling systems for the wafers or modules which are to be examined, as well as the possibility of automatic focusing.

It is known that the optical resolution of a microscope is dependent on the wavelength of the illumination light and on the objective numerical aperture. Since the objective numerical aperture cannot be increased arbitrarily, ever shorter wavelengths of the illumination light are being selected in order to resolve ever smaller structures. Therefore, ultraviolet light is used for resolution of the very small structures on wafers for large scale integrated circuits. Currently, illumination wavelengths of between 248 nm and 365 nm are customary in inspection microscopes.

Document 199 31 954 A1 describes an inspection microscope which operates with a plurality of wavelength regions. The light source used is, for example, a mercury vapor lamp with spectral components in the different wavelength regions. The wavelength regions in question are: firstly the visible wavelength region up to approx. 650 nm, referred to as the VIS region (short for "visible"), secondly the lamp line of the mercury vapor lamp which is known as the "i line", with a wavelength $\lambda_{i\ line}$=365 nm, and thirdly a narrow wave-length band between approx. 200 and 300 nm from the deep ultraviolet wavelength region, also referred to below as the DUV region for short. The DUV wavelength band, which is characterized by its spectral peak value position and its half-intensity width, is filtered out of the light spectrum of the light source using a reflection filter system.

The illumination optics and the imaging optics of the microscope are corrected and modified for all three wavelength regions. The microscope image for the VIS region is displayed by means of eyepieces or in addition a camera for the VIS region. The microscope image for the i line and the DUV region is made visible using a UV-sensitive TV camera.

SUMMARY OF THE INVENTION

In the microscope described above, it has been found that, in particular for the DUV region, the camera image did not satisfy the high requirements of users in all applications. To improve the illumination and imaging conditions in the DUV region, it would be necessary to use a laser with a higher power than the mercury vapor lamp, which accordingly entails significantly higher procurement and maintenance costs and may also require the use of a more sensitive and therefore more expensive camera.

Therefore, it is an object of the present invention to provide an inspection microscope which avoids the use of a higher-power and more expensive laser and at the same time provides a significantly improved image quality in all three wavelength regions, but especially in the DUV region.

This object is achieved by an inspection microscope for a plurality of wavelength regions, having at least one illumination beam path and at least one imaging beam path, which is distinguished by the fact that those, preferably stationary, optical components in the illumination beam path and in the imaging beam path through which beams of all wavelength regions pass are covered with a reflection-reducing layer, in which the reduced-reflection wavelength regions are the visible VIS wavelength region up to approx. 650 nm, the i line at $\lambda$=365 nm and the ultraviolet DUV wavelength region from 240 nm to 270 nm.

The idea was to arrange wavelength region-specific optical components everywhere in the microscope beam path where in each case only beams of a single wavelength region are to be found. A component changer having the required number of wavelength region-specific optical components is arranged at each of the locations in the microscope beam path where in each case alternately only beams belonging to a single one of the three wavelength regions pass. With this component changer it is possible to introduce in each case one of these components which is corrected and optimized to the wavelength region which is currently in use into the beam path. The component changer may in this case be designed, for example, as a linear slide or a rotary disk, on which the wavelength region-specific optical components are arranged.

However, in the illumination beam path and in the imaging beam path there are optical components through which rays of all the wavelength regions pass. These are preferably the stationary optical components. These have to be optimized for all three wavelength regions. To this end, according to the invention, they are covered with a reflection-reducing layer, at which the reduced-reflection wavelength regions are the visible VIS wavelength region up to 650 nm, the i line at $\lambda$=365 nm and the ultraviolet DUV wavelength region from 240 nm to 270 nm.

The reduced-reflection, stationary optical components of the inspection microscope preferably consist of quartz glass or of $CaF_2$, since these two materials, among the materials which transmit in the ultraviolet wavelength region, are the ones which are suitable for industrial use (with regard to price, environmental stability, processing properties, etc.). The refractive index for quartz glass is $n_e$=1.46, and the refractive index for $CaF_2$ is $n_e$=1.43.

In one embodiment of the inspection microscope according to the invention, the reflection-reducing layer has a sandwich structure which consists of the materials M2(a mixed substance comprising $La_2O_3$.3.3 $Al_2O_3$ produced by Merck) and $MgF_2$. A plurality of layers comprising M2 and $MgF_2$ are alternately applied from these materials, with the first layer i.e. the bottom layer consisting of M2 and the final layer consisting of $MgF_2$. In this case, approximately eight to ten layers are required for the sandwich structure in order to achieve at least good results in terms of the reflection reduction. Fewer than eight layers in the sandwich structure produces a reflection-reducing layer which is only able to satisfy low demands. To achieve a very good reduction in reflection, it is generally necessary to use more than ten layers in the sandwich structure.

In another embodiment of the inspection microscope according to the invention, the reflection-reducing layer has a sandwich structure comprising three materials, the materials being M2 (a mixed substance comprising $La_2O_3.3.3$ $Al_2O_3$ produced by Merck), $MgF_2$ and $Al_2O_3$. In this embodiment, a plurality of layers of $Al_2O_3$ and M2 are applied alternately in the lower part of the sandwich structure, and a plurality of layers comprising M2 and $MgF_2$ are applied alternately in the upper part of the sandwich structure. In this case too, the final layer consists of $MgF_2$. In a very simple variant on this embodiment, only a single layer of $Al_2O_3$ is applied, specifically as the bottom layer.

In a further embodiment of the inspection microscope according to the invention, the reflection-reducing layer likewise has a sandwich structure comprising three materials, the materials in this case being M2 (a mixed substance comprising $La_2O_3.3.3$ $Al_2O_3$ produced by Merck), $MgF_2$, and $SiO_2$. In this embodiment, starting with M2, a plurality of layers comprising M2 and $SiO_2$ are applied alternately to the lower part of the sandwich structure, and a plurality of layers comprising M2 and $MgF_2$ are applied alternately in the upper part of the sandwich structure. In this case, too, the final layer consists of $MgF_2$.

The most favorable embodiment of the above-mentioned embodiment reflection-reducing layer is obtained if, in the abovementioned sandwich structure, i.e. alternating with M2, it has precisely three layers comprising $SiO_2$ and three layers comprising $MgF_2$. In this structure, it was possible to achieve a reflection-reducing layer with optimally low residual reflection values. The mean reflection value for the VIS wavelength region and the i line was $\leq 1.0\%$ and the mean reflection value for the DUV wavelength region was $\leq 0.5\%$. The inspection micro-scope which is equipped with this reflection-reducing layer in accordance with the invention has a significant improvement to the image quality in all three wavelength regions used (VIS, i line, DUV). The most significant improvement to the image quality was in this case achieved in the DUV region. In this way, the use of a laser, which is significantly more powerful than the mercury vapor lamp and is therefore significantly more expensive to procure and maintain, for the DUV region was avoided.

With the inspection microscope known from the prior art, it was found that too little of the output light energy from the laser reached the object to be observed or examined, for example a wafer. This effect occurred even though a targeted reduction in reflection was carried out for all three wavelength regions (VIS, DUV, i line) at the optical components used, such as lenses, lens clusters, beam splitters, etc., in order to avoid false light and diffuse background illumination of the object to be examined. The drawbacks of the reflection-reducing layer used on the optical components were the high maximum residual reflection, which in the DUV region (i.e. in the wavelength region of $\lambda=248$ nm $\pm 15$ nm) was approx. 1.6%. Moreover, in the VIS region they had a relatively high residual reflection of approx. 1.3%. Moreover, this reflection-reducing layer was not suitable for light with a wavelength $\lambda=356$ nm (i.e. the i line). Other known reflection reducing layers which are designed for the i line and the VIS region, are altogether unsuited to an inspection microscope, since the residual reflection of reflection-reducing layers of this type in the DUV region is approx. 15 to 20% and above. This meant that despite the optimization of the optics of known inspection microscopes, an insufficient image brightness and image quality were found in very specific applications, affecting in particular the DUV region.

Therefore, it is a further object of the present invention to improve the transmission of an inspection microscope for the three spectral regions mentioned, but especially in the DUV region.

This object is achieved by a reflection-reducing layer for a plurality of wavelength regions, in which the reduced-reflection wavelength regions are the visible VIS wavelength region up to 650 nm, the i line at $\lambda=365$ nm and the ultraviolet DUV wavelength region at 240 to 270 nm.

In one specific embodiment, the reflection-reducing layer is designed for optical components made from quartz glass or from $CaF_2$, as are typically used in an inspection microscope with the three above-mentioned spectral regions VIS, i line and DUV. It is possible to use optical components made from other materials which also transmit DUV. However, in practice such situations will seldom arise, since other materials which will transmit DUV are not usually suitable for industrial use, since they are too expensive, too difficult to process or are not sufficiently durable under standard ambient conditions, e.g. in terms of atmospheric humidity, temperature, radiation stability.

When optimizing the layer thicknesses of the sandwich structure of the reflection-reducing layer, it was first of all attempted to reduce the residual reflections throughout the entire spectral region from 240 nm to approx. 700 nm. Layer designs comprising ten to sixteen layers were developed as a solution, but they revealed an increase in the residual reflection level throughout the entire spectral region and therefore did not improve the image quality in the inspection microscope. Therefore, the development was directed in targeted fashion at a reflex-reducing layer which selectively reduces reflection for the three wavelength regions required (VIS, i line and DUV).

The reflection-reducing layer according to the invention is a multilayer design which for the first time has been matched to all three spectral regions VIS, i line and DUV and therefore inevitably requires more layers than the known reflection-reducing layers, which only had to satisfy lower demands.

The layer design was developed with the aid of the Levenberg-Marquardt optimization method, which is available in the commercially available thin-film calculation software FILM*STAR produced by FTG-Software. The coating tests to verify the theoretical design were carried out on an APS 904 evaporation coating installation produced by Leybold Systems AG, Hanau.

Three different embodiments were developed for the reflection-reducing layer according to the invention.

The first embodiment comprises a reflection-reducing layer which has a sandwich structure which consists of just two materials, namely M2 (a mixed substance comprising $La_2O_3.3.3$ $Al_2O_3$ produced by Merck) and $MgF_2$. Starting with M2, a plurality of layers of M2 and $MgF_2$ are applied alternately, with the final layer consisting of $MgF_2$.

In this layer design, good adhesive strength and resistance to abrasion in this reflection-reducing layer is achieved as a result of the optical components which are to be coated being heated to approx. 250° C. to 300° C. for the coating. However, the relatively long heating and cooling times lead to relatively long production times for the individual batches. Moreover, there is a risk of undesirable thermal stresses being formed in the optical components and/or the reflection-reducing layers. The more complicated the shapes and the larger the dimensions of the optical components, the greater this risk becomes.

In another embodiment of the reflection-reducing layer according to the invention, the layer has a sandwich structure comprising three materials, these materials being M2 (a mixed substance comprising $La_2O_3.3.3$ $Al_2O_3$ produced by Merck), $MgF_2$ and $Al_2O_3$. In this embodiment, starting with $Al_2O_3$, a plurality of layers comprising $Al_2O_3$ and M2 are applied alternately in the lower part of the sandwich structure and a plurality of layers comprising M2 and $MgF_2$ are applied alternately in the upper part of the sandwich structure. The final layer consists of $MgF_2$. In a very simple variant of this embodiment, only a single layer of $Al_2O_3$ is applied, specifically as the bottom layer.

A further embodiment of the reflection-reducing layer, which as the sandwich structure likewise comprises three materials, has proven to be the most favorable variant in technical terms. As well as the materials M2 (a mixed substance comprising $La_2O_3.3.3\ Al_2O_3$ produced by Merck) and $MgF_2$, the third material selected, rather than $Al_2O_3$, was $SiO_2$. Starting with M2, a plurality of layers comprising M2 and $SiO_2$ are applied alternately in the lower part of the sandwich structure. A plurality of layers comprising M2 and $MgF_2$ are applied alternately in the upper part of the sandwich structure, with the final layer consisting of $MgF_2$.

$SiO_2$ has the advantage that the optics parts, when the APS technology (APS=Advanced Plasma Source), with which the person skilled in the art will be familiar, is used, do not have to be heated to such a high temperature (approx. 180° C. is sufficient) as in the case of the first embodiment using the combination of $M2/MgF_2$ to achieve the same bonding strength and resistance to abrasion of the reflection-reducing layer.

Since $MgF_2$ is a fluoride, it cannot be deposited by ion-enhanced evaporation coating. It is not possible to completely dispense with $MgF_2$ and therefore to use "cold-coating", since it is not possible to do without the low refractive index of 1.38 in the case of $MgF_2$ and the associated low residual reflection properties without adversely affecting the properties of the reflection-reducing layer according to the invention.

The best results are achieved if in a reflection-reducing layer comprising the three materials mentioned above, the sandwich structure has precisely three layers of $SiO_2$ and three layers of $MgF_2$, i.e. the sandwich structure is composed of a total of fourteen layers. In this case, the final three layers, with a low refractive index, of $MgF_2$ effect low residual reflection, while at the same time all the other layers with a low refractive index, comprising $SiO_2$, ensure a stable base for the layer design. At the same time, it is sufficient to heat the optic parts to a lower temperature.

With this layer design, it is possible to achieve a reflection-reducing layer with optimally low residual reflection values. In this case, in an advantageous variant of the layer design, the mean reflection value for the VIS wavelength region and the i line was ≦1.0% and the mean reflection value for the DUV wavelength region was ≦0.5%.

It is also possible to reduce the reflection for the above-mentioned wavelength regions by using fewer than fourteen layers. However, these solutions have the drawback that the residual reflection of the reflection-reducing layer is higher.

The relatively high number of layers for a reflection-reducing layer could be reduced further by using other materials with an even higher refractive index (compared to 1.38 for $MgF_2$). For the DUV region, $HfO_2$ is currently the only known material which is to some extent free of absorption. However, practical experience with this material has shown that absorption occurs even at 240 nm, and increases still further toward shorter wavelengths.

Therefore, this material has not been used, and only materials which are known to be free of absorption or to have low absorption in the wavelength regions mentioned have been employed.

A further reduction in the residual reflection of the reflection-reducing layer could be achieved by using even more layers in the sandwich structure. In this case, however, significantly more layers would be required based on the effect which can be achieved, and consequently the manufacturing outlay becomes too high for most applications. At the same time, the interfering scattering effect and the residual absorption in the layer system would increase.

The invention is explained in more detail below on the basis of examples and the drawing, in which.

BRIEF DESCRIPTION OF THE DRAWINGS

DETAILED DESCRIPTION OF EMBODIMENTS OF THE INVENTION

Figure 1:
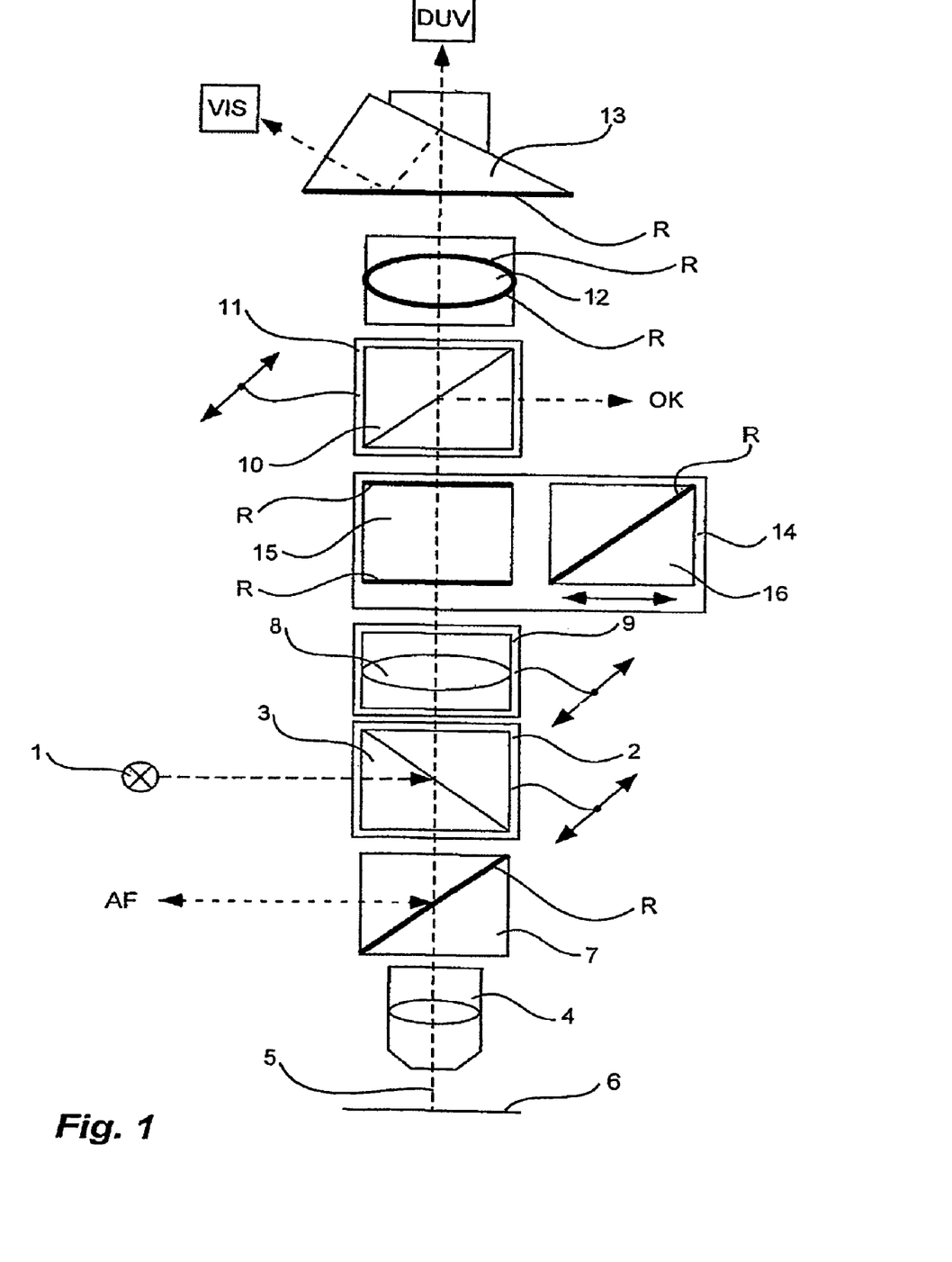
FIG. 1: shows a diagrammatic optical structure of an inspection microscope.

FIG. 1 shows a diagrammatic optical structure of an inspection microscope. An illumination beam emerges from a light source 1 and passes, via illumination optics (not shown in more detail here), to an illumination beam splitter slide 2. Various illumination beam splitters 3, which are each assigned to a specific wavelength region (VIS, DUV, i line) of the illumination light, are arranged on the illumination beam splitter slide 2. The beam splitter 3 located in the beam path in the illustration diverts the associated part of the illumination light toward the objective 4. This diverted beam path is diagrammatically indicated by an optical axis 5. The illumination beam produced in this way is focused by the objective 4 on to a specimen 6 (for example a wafer). What is known as an autofocus beam splitter 7, via which the light of an autofocusing device AF is introduced into the beam path by means of a beam splitter layer, is arranged in the beam path between the beam splitter 3 and the objective 4. The autofocus light passes through the objective 4 and is likewise projected by the latter on to the specimen 6. From there, the autofocus light is passed back via the beam splitter 7 to the autofocusing device AF. An assessment criterion for the focal position of the illumination light emanating from the light source 1 on the specimen surface 6 is derived from the light which returns from the specimen 6 by the autofocusing device AF. In the event of deviation from the ideal focal position, the distance between the objective 4 and the specimen 6 can be altered in such a way that anoptimum focus is produced.

The illumination light focused on to the specimen 6 returns from the specimen 6 as an imaging beam path and successively passes through the objective 4, the autofocus beam splitter 7, the illumination beam splitter 3, and a tube lens 8 which is arranged on a tube lens slide 9. The tube lens slide 9 bears a plurality of tube lenses, of which in each case that tube lens 8 which is optimized to the currently desired wavelength region is introduced into the beam path. The movement of the tube lens slide 9 is diagrammatically integrated by a double arrow. The imaging light then passes to an eyepiece beam splitter 10 on an eyepiece beam splitter slide 11, at which the imaging light is split, so that a first component of the light is diverted to an eyepiece OK and a second component of the light is diverted through an imaging optic 12 to a Bauernfeind prism 13. The eyepiece beam splitter slide 11 bears a plurality of eyepiece beam splitters 10 which are assigned to the different wavelength regions and can be introduced into the beam path as desired. The possibility of moving the eyepiece beam splitter slide 11 is diagrammatically indicated by a double arrow.

Visual inspection of the microscope image generated by the specimen 6 can be carried out by means of the eyepieces OK. In addition, there is the option of representing the microscope image on cameras. For this purpose, the imaging beam is split into a combined i line/DUV component and a VIS component at the Bauernfeind prism 13. The two beam components are each represented using wavelength-specific cameras. Therefore, the i line/DUV component is represented using a UV-sensitive camera DUV, and the VIS component is represented using a camera VIS which is matched to the visible spectral region. Therefore, the user of the microscope has the option of viewing the microscope image in a comfortable way, specifically, depending on the wavelength region which is set, on one camera or the other. The wavelength region is set by displacement of the illumination beam splitter 3, of the tube lens slide 9 and of the eyepiece beam splitter slide 11, which are referred to below by the collective term component changers. With the aid of these component changers 3, 9, 11, it is possible to arrange in each case wavelength region-specific optical components at the required locations in the microscope. These may be regions in the beam path past which in each case only beams of a single one of the three wavelength regions are guided. However, the optical components on the component changer in question may also be components which are designed and corrected very specifically for the respectively associated wavelength region. The component changer may, for example, be designed as a linear slide or as a rotary disk, on which the wavelength region-specific optical components are arranged.

An additional slide 14 is arranged as an additional component slide between the tube lens slide 9 and the eyepiece beam splitter slide 11. This additional slide 14 bears an optical compensation element 15 and an additional beam splitter 16, each of which can be introduced into the beam path as desired. In this case, the additional beam splitter 14, when it has been introduced into the beam path, is used to remove a light component of the imaging light for an additional module of the microscope from the beam path. This additional module may, for example, be a confocal module or an additional camera. If this additional beam splitter 16 is not required, the optical compensation element 15 is introduced into the beam path instead, by displacement of the additional slide 14. The displacement option is diagrammatically indicated by a double arrow. This optical compensation element 15 causes the imaging beam to pass through the same optical glass path length as would be the case if the additional beam splitter 16 were introduced. This prevents the imaging conditions in the beam path which follows from changing if the additional beam splitter 16 is removed from the beam path.

Those optical components through which beams of all the wavelength regions pass are arranged in a stationary position. Such components are the autofocus beam splitter 7, the imaging optics 12 and the entry surface of the Bauernfeind prism 13. The optical compensation element 15 or the additional beam splitter 16, when it is located in the beam path, are likewise identical for all three wavelength regions. These components which are in a stationary position in the beam path have to be optimized for all three wavelength regions. For this purpose, according to the invention, they are covered with a reflection-reducing layer, in which the reflection is reduced for the wavelength regions of the visible VIS wavelength region up to 650 nm, the i line at λ=365 nm and the ultraviolet DUV wavelength region at 240 nm to 270 nm.

The optical components of the inspection microscope, and therefore also the stationary optical components, preferably consist of quartz glass or of $CaF_2$, since these two materials, among the materials which transmit in the ultraviolet wavelength regions, are the ones which are most suitable for industrial processing and utilization. The reflection-reducing layer comprises a plurality of layers of different materials which form a sandwich structure. The layer systems which are used and are described in more detail below are matched to the substrates of the optical component by varying the layer thicknesses.

According to the invention, this reflection-reducing layer is applied to all critical interfaces of the stationary optical components. These are the beam splitter layer in the autofocus beam splitter 7, the beam splitter layer in the additional slide 14, the entry and exit surfaces of the optical compensation element 15, the front and rear lens surfaces of the imaging optics 12, which may also be composed of a plurality of elements, and the entry surface of the Bauernfeind prism 13. In FIG. 1, these layers are indicated by thick lines and the reference symbol R (for reflection-reducing layer). The reflection-reducing action of the layer is retained even when the angle of incidence on the respective layer is varied by 0°±15° and in the event of a possible process-induced change in the refractive indices of quartz and $CaF_2$ by ±0.02 and/or in the event of a variation in the thicknesses of the individual layers by ±5%.

Details of the layer designs are described below in FIG. 2-9. The layer structures are suitable both on quartz glass and on $CaF_2$ with the same layer thicknesses. In this way, it is possible for all stationary components in the inspection microscope to be coated on their critical surfaces with the same reflection-reducing layer and, at the same time, to achieve an optimum reduction in reflection. Using only a single layer represents a considerable simplification in production terms and therefore a cost benefit. However, what is much more important is that the inspection microscope which is equipped according to the invention with this reflection-reducing layer has a considerably improved image quality in all three wavelength regions used (VIS, i line, DUV). In this case, the most significant improvement in the image quality was achieved in the DUV region. It was possible to avoid having to use a laser, which is more powerful than the mercury vapor lamp and at the same time significantly more expensive for the DUV region.

Figure 2:
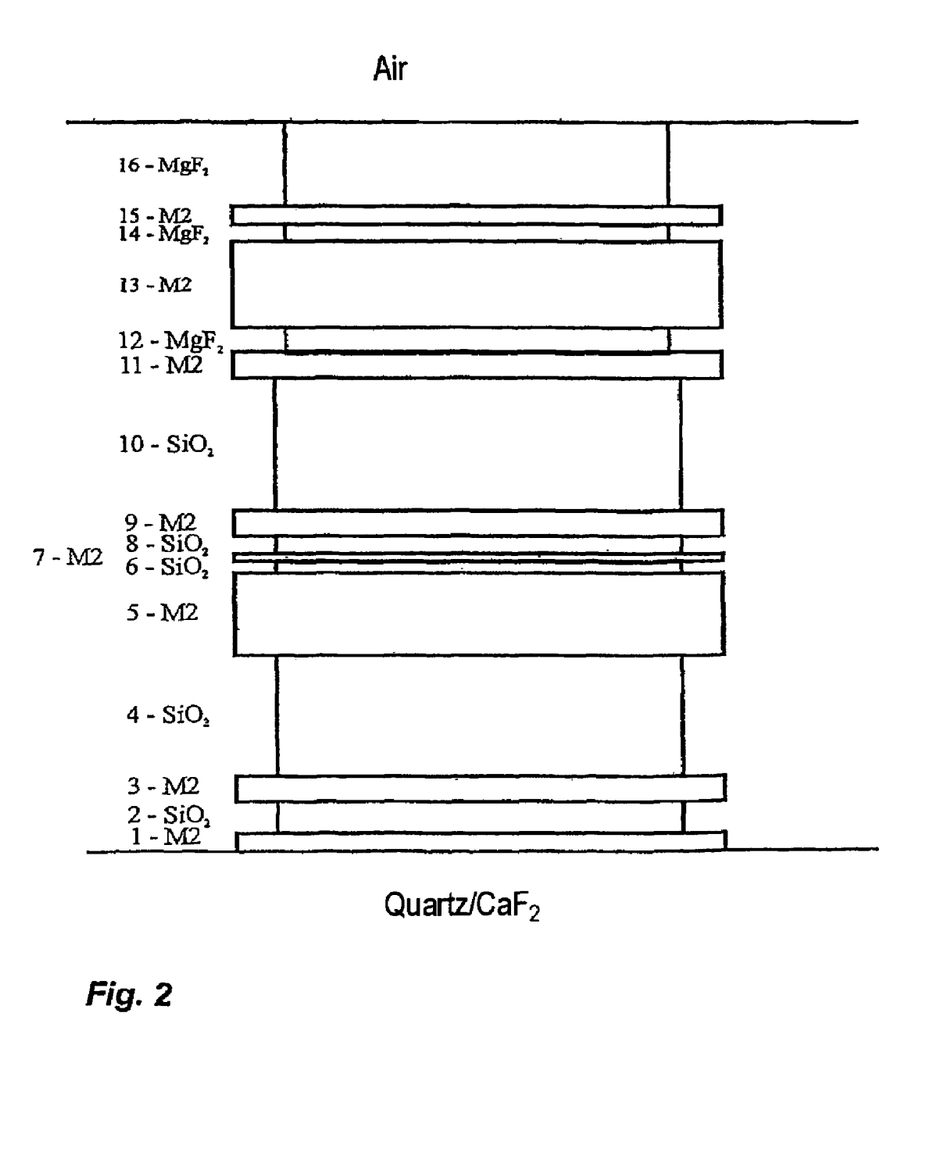
FIG. 2: shows a diagrammatic structure of a reflection-reducing layer having sixteen layers comprising $M2/MgF_2/SiO_2$ (cf. Table A)

FIG. 2 shows a diagrammatic structure of a reflection-reducing layer which consists of the three materials M2 (a mixed substance comprising $La_2O_3.3.3\ Al_2O_3$ produced by Merck) and $MgF_2$ and $SiO_2$. The layer comprises sixteen layers which are applied either to quartz or $CaF_2$. The bottom layer consists of M2, which is then followed by alternate layers of $SiO_2$ and M2. Layer No. 12 is the first $MgF_2$ layer, and this is then followed by an alternating sequence of M2 and $MgF_2$, with $MgF_2$ forming the final layer. The layer illustrated here has the layer structure represented in Table A below.

TABLE A

| Layer No. | Thickness in nm | Material |
|---|---|---|
| 1 | 14.9 | M2 |
| 2 | 25.57 | $SiO_2$ |
| 3 | 20.72 | M2 |
| 4 | 10.12 | $SiO_2$ |
| 5 | 66.94 | M2 |
| 6 | 9.17 | $SiO_2$ |
| 7 | 6.07 | M2 |
| 8 | 14.44 | $SiO_2$ |
| 9 | 21.87 | M2 |
| 10 | 110.66 | $SiO_2$ |
| 11 | 21.78 | M2 |
| 12 | 20.16 | $MgF_2$ |
| 13 | 70.39 | M2 |
| 14 | 14.05 | $MgF_2$ |
| 15 | 15.58 | M2 |
| 16 | 66.86 | $MgF_2$ |

The properties of the layer system are retained if the thicknesses of the individual layers vary by no more than ±5%. The layer design can be applied equally well to quartz and to $CaF_2$.

Figure 3:
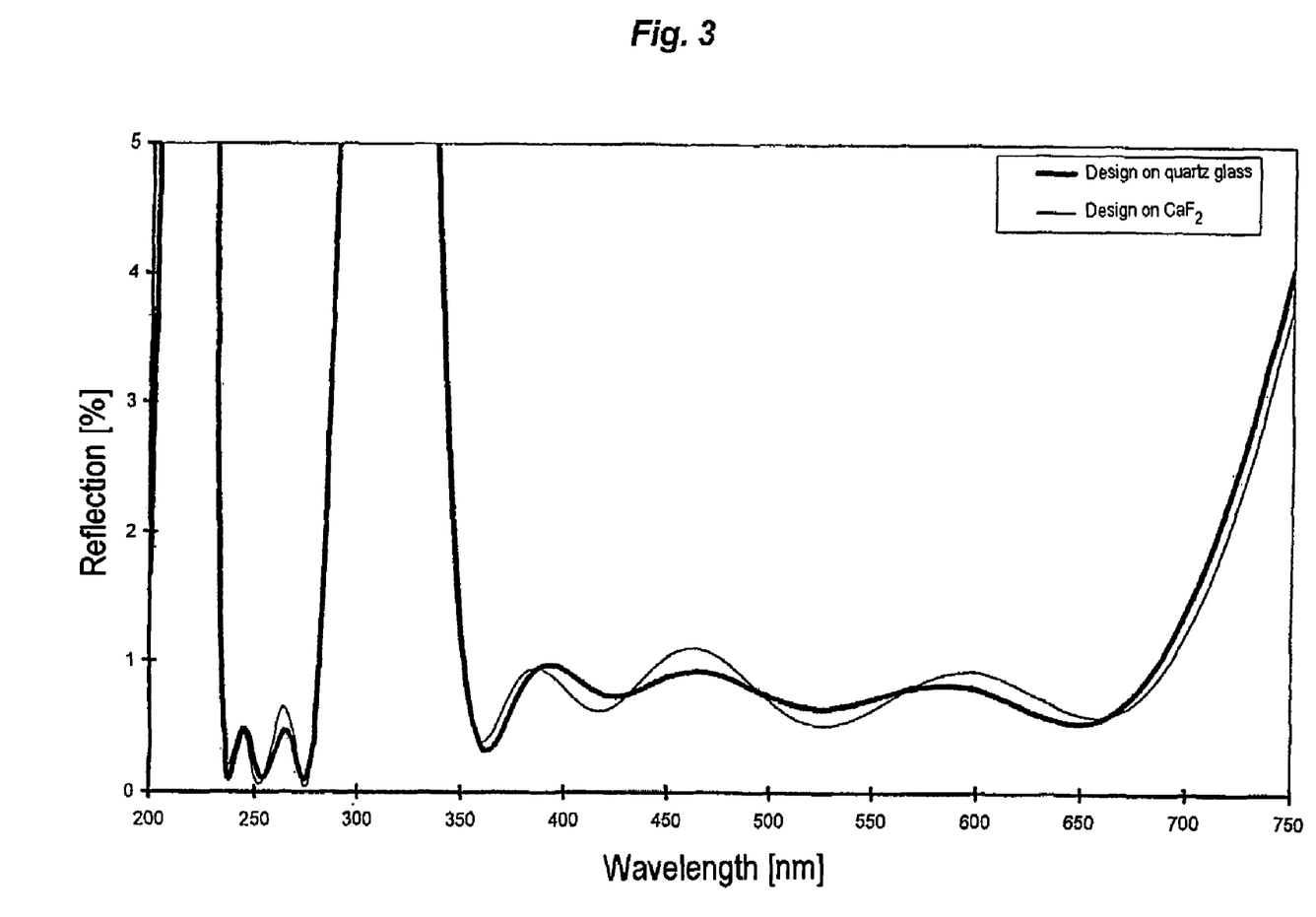
FIG. 3: shows a spectral curve of the residual reflection of a reflection-reducing layer having sixteen layers comprising $M2/MgF_2/SiO_2$, reducing reflection for VIS and i line and DUV (cf. Table A)

FIG. 3 shows the spectral curve of the residual reflection of the layer from FIG. 2. The figure reveals a very good reflection-reducing action for the DUV region around 250 nm and a good reduction in reflection for the visible region, from approx. 350 nm to 650 nm, and in part even up to 675 nm. The figure illustrates the residual reflection values for the reflection-reducing layer on two substrates, in one case applied to the substrate quartz glass (thick line) and in one case applied to the substrate $CaF_2$ (thin, continuous line).

Figure 4:
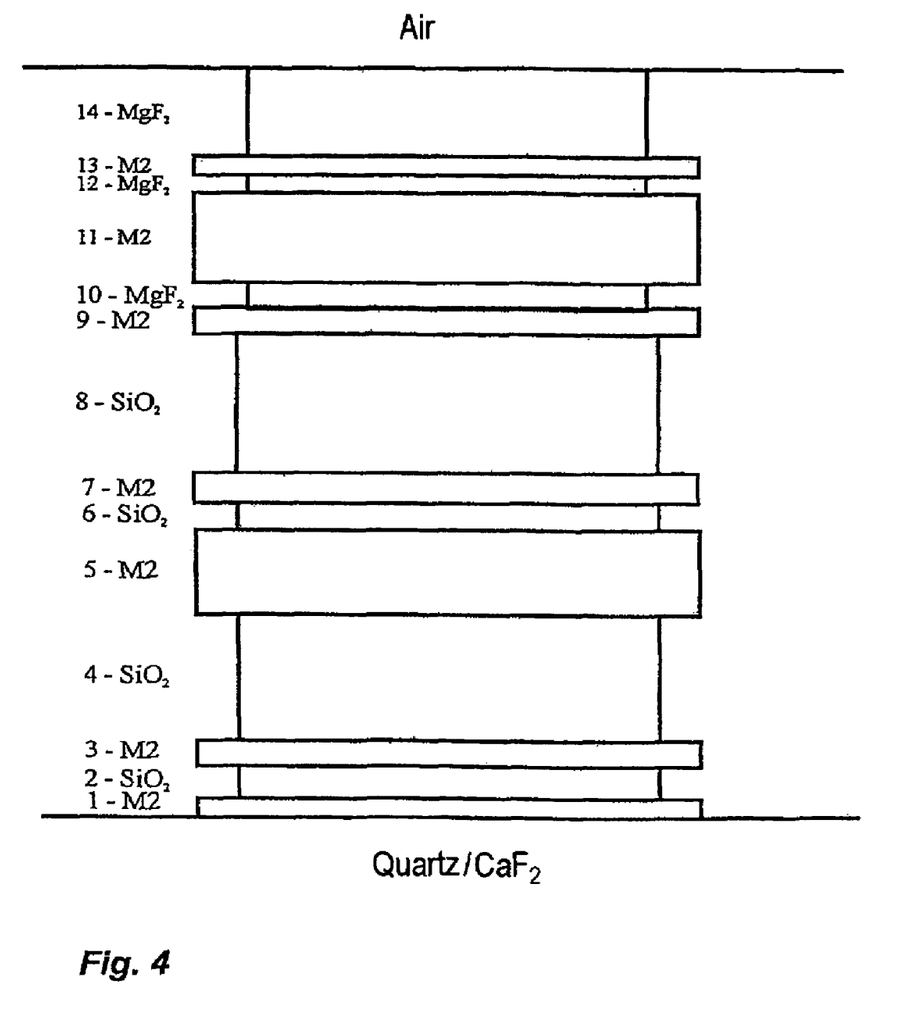
FIG. 4: shows a diagrammatic structure of a reflection-reducing layer having fourteen layers comprising $M2/MgF_2/SiO_2$ (cf. Table B)

FIG. 4 shows a diagrammatic structure of a reflection-reducing layer which likewise consists of the three materials M2, $MgF_2$ and $SiO_2$. This layer structure requires two fewer layers than that illustrated in FIG. 2. The details of the sandwich structure are reproduced in Table B below.

TABLE B

| Layer No. | Thickness in nm | Material |
|---|---|---|
| 1 | 13.95 | M2 |
| 2 | 27.60 | $SiO_2$ |
| 3 | 20.66 | M2 |
| 4 | 8.84 | $SiO_2$ |
| 5 | 69.42 | M2 |
| 6 | 20.90 | $SiO_2$ |
| 7 | 24.61 | M2 |
| 8 | 112.60 | $SiO_2$ |
| 9 | 21.02 | M2 |
| 10 | 20.60 | $MgF_2$ |
| 11 | 69.85 | M2 |
| 12 | 13.97 | $MgF_2$ |
| 13 | 16.01 | M2 |
| 14 | 66.65 | $MgF_2$ |

The properties of the layer system are retained if the thicknesses of the individual layers vary by no more than ±5%. The layer design can be applied equally well to quartz and to $CaF_2$.

Figure 5:
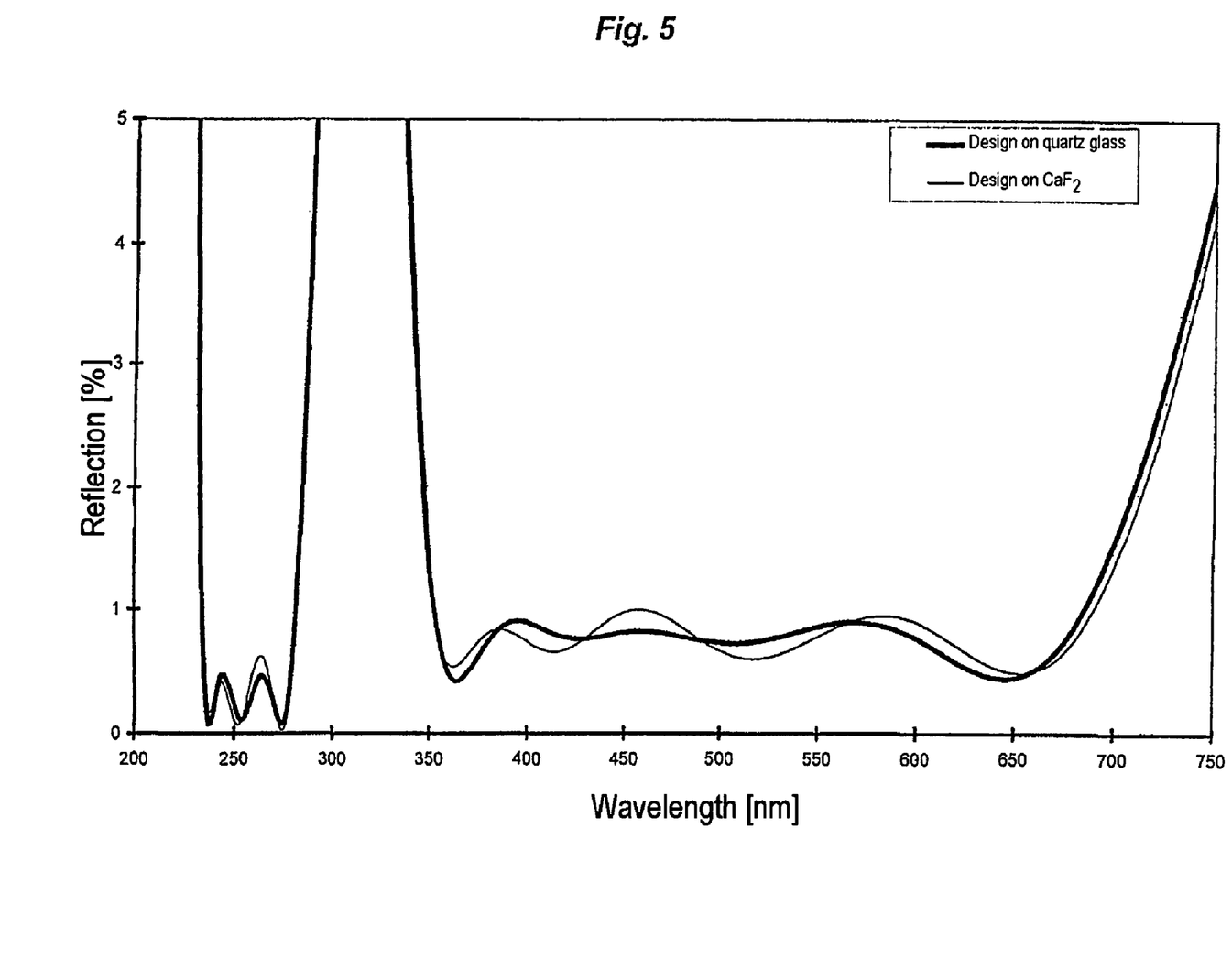
FIG. 5: shows a spectral curve of the residual reflection of a reflection-reducing layer having fourteen layers comprising $M2/MgF_2/SiO_2$, reducing reflection for VIS and i line and DUV (cf. Table B)

FIG. 5 shows the spectral curve of the residual reflection of the reflection-reducing layer shown in FIG. 4. It can be seen that this reflection-reducing layer, too, reduces reflection for the wavelength regions VIS, i line and DUV. Compared to the layer shown in FIG. 2 (cf. Table A), it can be seen that this layer with fourteen layers and therefore a reduced production outlay achieves even better reflection values compared to the reflection-reducing layer with sixteen layers from FIG. 2.

Figure 6:
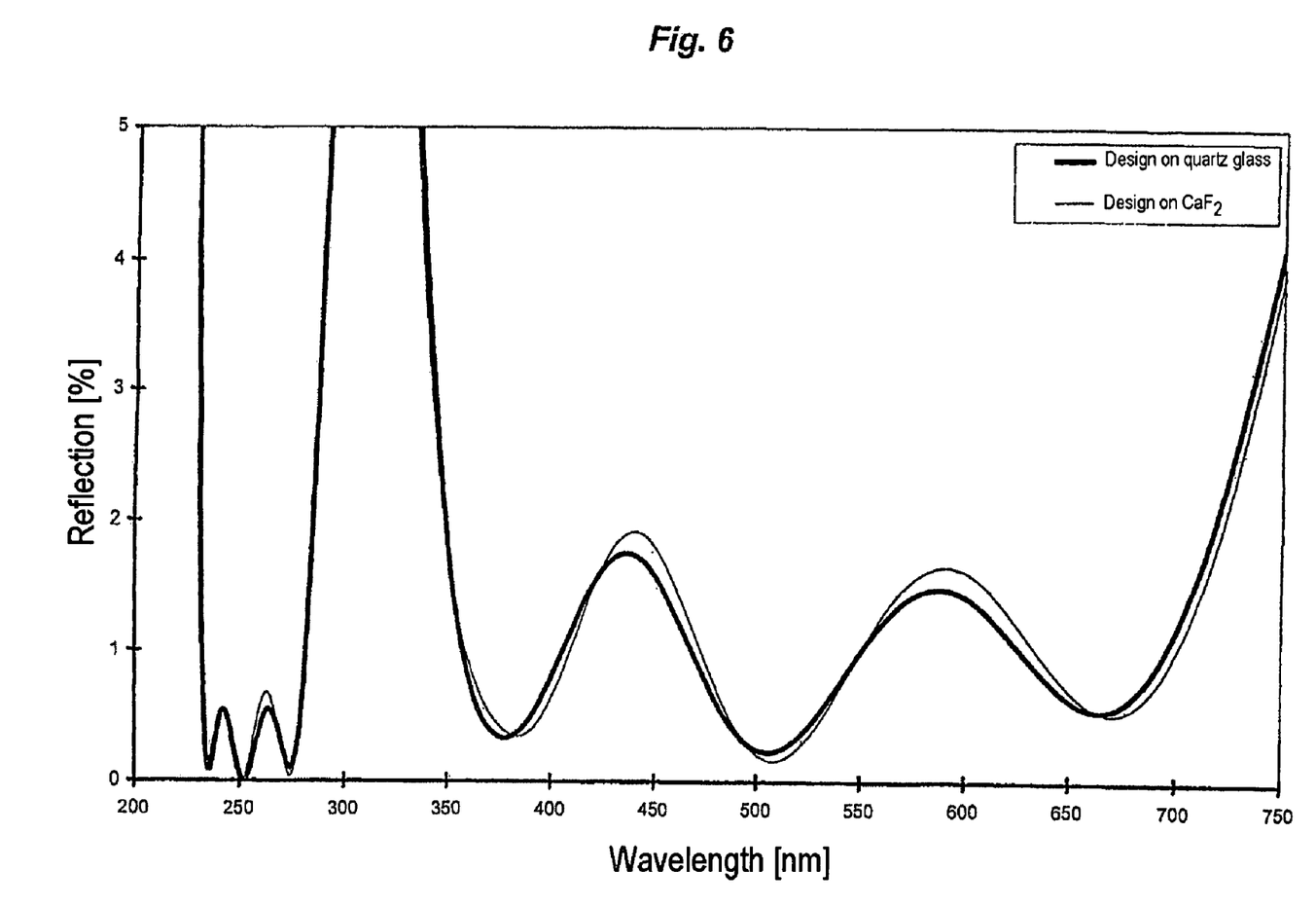
FIG. 6: shows a spectral curve of the residual reflection of a reflection-reducing layer having twelve layers comprising $M2/MgF_2/SiO_2$, reducing reflection for VIS and i line and DUV (cf. Table C)

FIG. 6 shows the spectral curve of the residual reflection of a reflection-reducing layer having twelve layers comprising the three materials M2, $MgF_2$ and $SiO_2$. The layer structure is described by Table C below.

TABLE C

| Layer No. | Thickness in nm | Material |
|---|---|---|
| 1 | 15.71 | M2 |
| 2 | 21.57 | $SiO_2$ |
| 3 | 96.82 | M2 |
| 4 | 20.75 | $SiO_2$ |
| 5 | 25.35 | M2 |
| 6 | 114.91 | $SiO_2$ |
| 7 | 19.29 | M2 |
| 8 | 20.47 | $MgF_2$ |
| 9 | 67.52 | M2 |
| 10 | 14.19 | $MgF_2$ |
| 11 | 17.22 | M2 |
| 12 | 65.82 | $MgF_2$ |

The properties of the layer system are retained if the thicknesses of the individual layers vary by no more than ±5%. The layer design can be applied equally well to quartz and to $CaF_2$.

It can be seen from the residual reflection curve in FIG. 6 that reducing the number of layers to twelve layers in the sandwich structure means having to accept a significant deterioration in the residual reflection in the region of the i line and of the VIS region, while the residual reflection in the DUV region is still very good. It can therefore be seen that it is not possible to arbitrarily reduce the size of the layer structure, as would be desirable for thin-film fabrication.

Therefore, compared to FIGS. 3, 5 and 6, it can be stated that the layer structure with fourteen layers with M2, $MgF_2$ and $SiO_2$, as reproduced in Table B, represents the most favorable structure with regard to the reflection-reducing effect over the widest possible spectral bandwidth.

Figure 7:
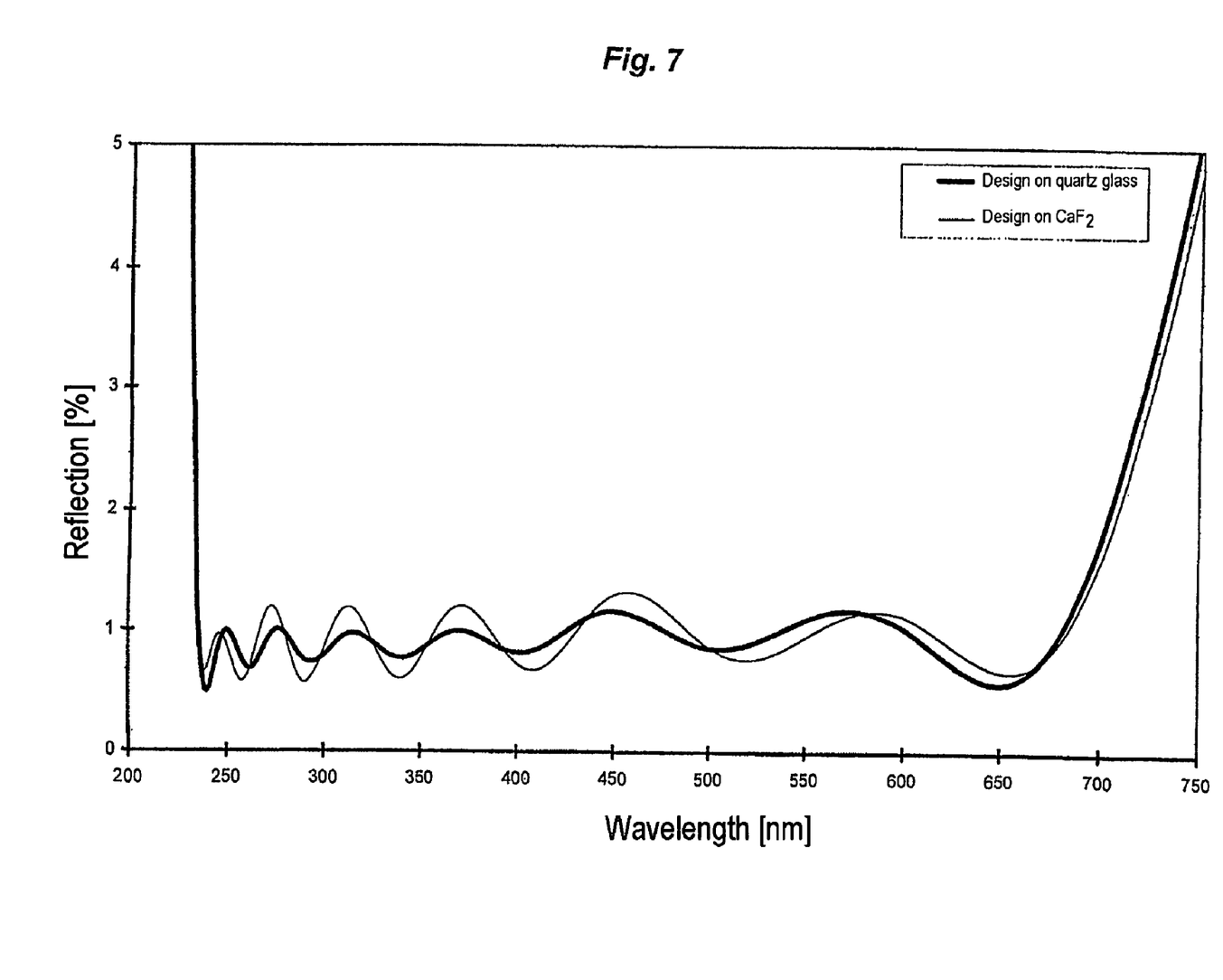
FIG. 7: shows a spectral curve of the residual reflection of a reflection-reducing layer having fourteen layers comprising $M2/MgF_2/SiO_2$, reducing reflection for the entire region from VIS through i line to DUV (cf. Table D)

FIG. 7 shows the spectral curve of the residual reflection of a reflection-reducing layer which like-wise consists of the three materials M2, $MgF_2$ and $SiO_2$. This layer too comprises fourteen individual layers in the sandwich structure. In tests, this layer was specifically designed to reduce the reflection continuously throughout the entire region from the visible region through the i line to the DUV region. The corresponding layer structure is reproduced in Table D below.

TABLE D

| Layer No. | Thickness in nm | Material |
|---|---|---|
| 1 | 7.08 | M2 |
| 2 | 28.54 | $SiO_2$ |
| 3 | 18.90 | M2 |
| 4 | 11.79 | $SiO_2$ |
| 5 | 99.82 | M2 |
| 6 | 15.97 | $SiO_2$ |
| 7 | 15.98 | M2 |
| 8 | 126.92 | $SiO_2$ |
| 9 | 19.24 | M2 |
| 10 | 12.55 | $MgF_2$ |
| 11 | 63.48 | M2 |
| 12 | 8.65 | $MgF_2$ |
| 13 | 25.04 | M2 |
| 14 | 65.56 | $MgF_2$ |

The properties of the layer system are retained if the thicknesses of the individual layers vary by no more than ±5%. The layer design can be applied equally well to quartz and to $CaF_2$.

As can be seen from the residual reflection curve, which once again can be applied both to quartz glass and to $CaF_2$, such a broad-banded residual reflection does not offer any benefit compared to selective residual reflection. Compared to FIG. 5, it is even necessary to accept significant losses in the quality of the reduction in reflection. Therefore, the idea of broad-banded reduction in reflection over such a wide spectral region was renounced again, since the selective reduction in reflection gave more effective results.

Figure 8:
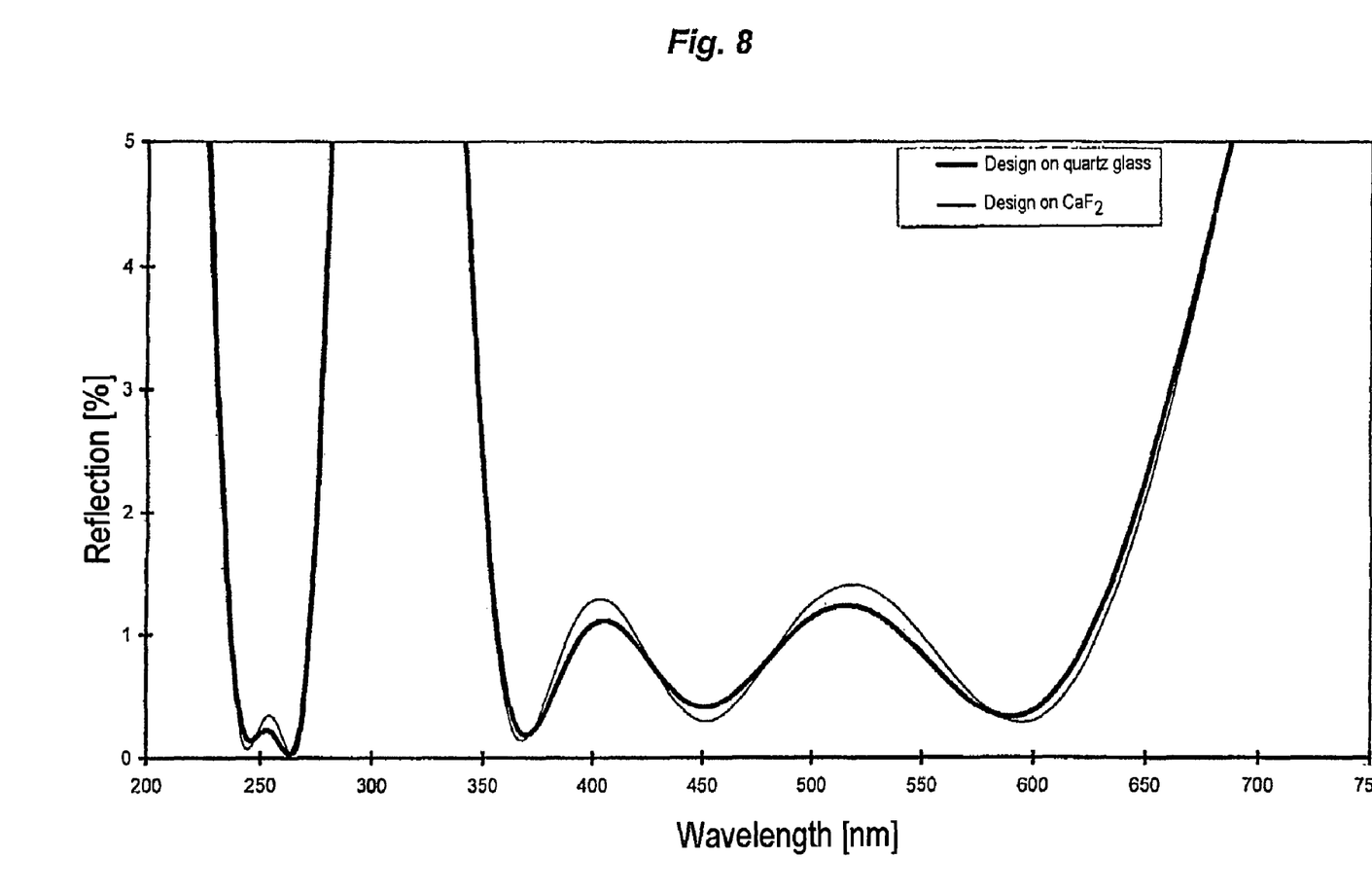
FIG. 8: shows a spectral curve of the residual reflection of a reflection-reducing layer having six layers comprising $M2/MgF_2/Al_2O_3$, reducing reflection for VIS and i line and DUV (cf. Table E)

FIG. 8 shows a spectral curve of the residual reflection of a reflection-reducing layer which is composed of the three materials M2, $MgF_2$ and $Al_2O_3$. The variant of the layer design which is implemented here makes do with just six layers. The layer design is reproduced in Table E below.

TABLE E

| Layer No. | Thickness in nm | Material |
|---|---|---|
| 1 | 136.17 | $Al_2O_3$ |
| 2 | 175 | $MgF_2$ |
| 3 | 24.26 | M2 |
| 4 | 26.85 | $MgF_2$ |
| 5 | 14.66 | M2 |
| 6 | 77.29 | $MgF_2$ |

The properties of the layer system are retained if the thicknesses of the individual layers vary by no more than ±5%. The layer design can be applied equally well to quartz and to $CaF_2$.

The layer has the effect of reducing reflection for the wavelength regions VIS, i line and DUV, but the reduced-reflection wavelength region around the DUV wavelength 250 nm is significantly narrower than with the layers which have already been described above. The reduction in reflection in the i line region and in the visible wavelength region is also significantly worse than, for example, in the case of the layer which is described spectrally in FIG. 5. Therefore, it can be stated that it is indeed possible to achieve a reduction in reflection in the above-mentioned wavelength regions with a very small number of layers, but definite concessions have to be made with regard to the range of applications.

Figure 9:
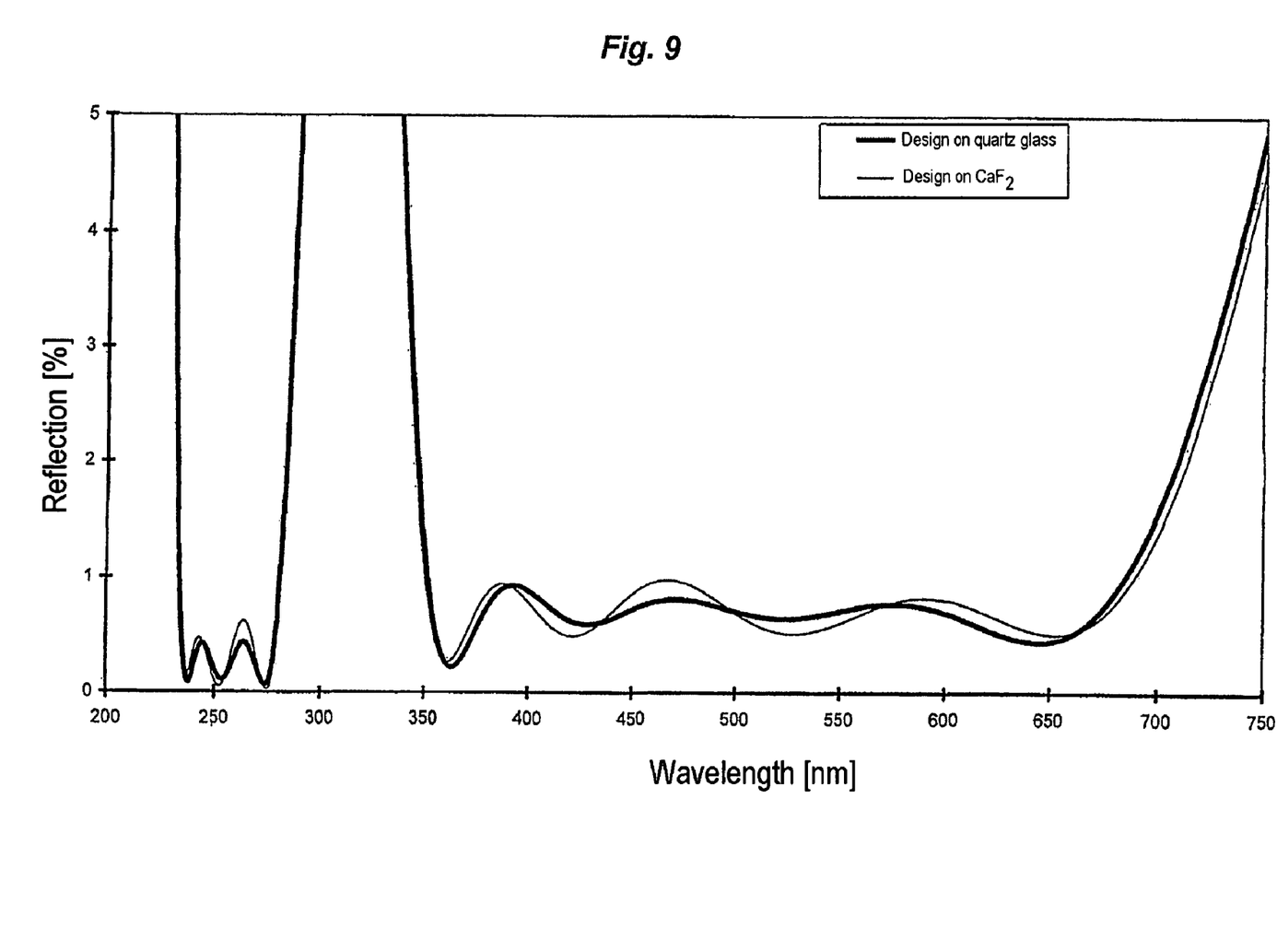
FIG. 9: shows a spectral curve of the residual reflection of a reflection-reducing layer having fourteen layers comprising $M2/MgF_2$, reducing reflection for VIS and i line and DUV (cf. Table F).

FIG. 9 shows the spectral curve of the residual reflection of a reflection-reducing layer comprising just two materials, specifically M2 and $MgF_2$. The reflection-reducing layer consists of fourteen individual layers in the sandwich structure as can be seen from Table F below.

TABLE F

| Layer No. | Thickness in nm | Material |
|---|---|---|
| 1 | 14.56 | M2 |
| 2 | 15.38 | $MgF_2$ |
| 3 | 19.55 | M2 |
| 4 | 10.64 | $MgF_2$ |
| 5 | 87.07 | M2 |
| 6 | 22.38 | $MgF_2$ |
| 7 | 21.89 | M2 |
| 8 | 123.66 | $MgF_2$ |
| 9 | 17.88 | M2 |
| 10 | 26.19 | $MgF_2$ |
| 11 | 68.93 | M2 |
| 12 | 12.7 | $MgF_2$ |
| 13 | 16.16 | M2 |
| 14 | 66.19 | $MgF_2$ |

The properties of the layer system are retained if the thicknesses of the individual layers vary by no more than ±5%. The layer design can be applied equally well to quartz and to $CaF_2$.

The reduction in reflection is effective for the wavelength regions VIS, i line and DUV. The quality of the reduction in reflection is generally comparable to the layer which has been described in FIG. 5. However, the layer comprises M2 and $MgF_2$ i.e. the design from Table F, has the significant drawback compared to the layer comprising M2, $MgF_2$, i.e. the layer design from Table B, that the substrates have to be heated to a significantly higher temperature during the coating operation, as has already been described above.

Depending on the particular requirements imposed on the reduction in reflection which is needed, it is also possible for the reflection-reducing layers described above to be used in general terms on any desired optical element. These may also be optical elements in other microscopes or other optical devices. In general, their use on optical components made from quartz glass or $CaF_2$ is possible. Depending on the particular application, a sufficient reduction in reflection can even be achieved with a very small number of layers, as reproduced, for example, in FIG. 8 and Table E. A good to very good reduction in reflection can even be achieved with the layer systems with 12 to 14 layers given above.

| List of reference symbols | |
|---|---|
| 1 | Light source |
| 2 | Illumination beam splitter slide |
| 3 | Illumination beam splitter |
| 4 | Objective |
| 5 | Optical axis |
| 6 | Specimen |
| 7 | Autofocus beam splitter |
| 8 | Tube lens |
| 9 | Tube lens slide |
| 10 | Eyepiece beam splitter |
| 11 | Eyepiece beam splitter slide |
| 12 | Imaging optic |
| 13 | Bauernfeind prism |
| 14 | Additional slide |
| 15 | Optical compensation element |
| 16 | Additional beam splitter |
| AF = | Autofocusing device |
| OK = | Eyepiece |
| DUV = | Camera for DUV region and i line |
| VIS = | Camera for VIS region |

The invention claimed is:

1. An inspection microscope for a plurality of wavelength regions comprising:
   at least one illumination beam path and
   at least one imaging beam path;
   wherein optical components in the illumination beam path and in the imaging beam path through which beams of all wavelength regions pass are covered with a reflection-reducing layer,
   wherein the reflection-reducing layer reduces an amount of reflection of light at specific reduced-reflection wavelength regions incident on the optical components relative to an amount of reflection of light at the reduced-reflection wavelength regions incident on the optical components without such a layer,
   wherein the reduced-reflection wavelength regions are the visible ("VIS") wavelength region up to approximately 650 nm, the i line at $\lambda=365$ nm and the deep ultraviolet ("DUV") wavelength region from 240 nm to 270 nm,
   wherein the reflection-reducing layer has a sandwich structure which comprises the materials:
   M2,
   and $MgF_2$;
   wherein the sandwich structure comprises a plurality of layers of M2 and $MgF_2$ applied alternately and the final layer comprising $MgF_2$; and
   wherein M2 is a mixed substance comprising $La_2O_3.3.3$ $Al_2O_3$.

2. An inspection microscope for a plurality of wavelength regions comprising:
   at least one illumination beam path and
   at least one imaging beam path;
   wherein optical components in the illumination beam path and in the imaging beam path through which beams of all wavelength regions pass are covered with a reflection-reducing layer,
   wherein the reflection-reducing layer reduces an amount of reflection of light at specific reduced-reflection wavelength regions incident on the optical components relative to an amount of reflection of light at the reduced-reflection wavelength regions incident on the optical components without such a layer,
   wherein the reduced-reflection wavelength regions are the visible ("VIS") wavelength region up to approximately 650 nm, the i line at $\lambda=365$ nm and the deep ultraviolet ("DUV") wavelength region from 240 nm to 270 nm,
   wherein the reflection-reducing layer has a sandwich structure which comprises the materials:
   M2,
   $MgF_2$,
   and $Al_2O_3$;
   wherein the sandwich structure comprises a plurality of layers of $Al_2O_3$ and $MgF_2$ being applied alternately in the lower part of the sandwich structure and a plurality of layers of M2 and $MgF_2$ being applied alternately in the upper part of the sandwich structure, and with the final layer comprising $MgF_2$; and
   wherein M2 is a mixed substance comprising $La_2O_3.3.3$ $Al_2O_3$.

3. A reflection-reducing layer for a plurality of wavelength regions, wherein the reflection-reducing layer is configured to reduce an amount of reflection of light at specific reduced-reflection wavelength regions incident on optical components relative to an amount of reflection of light at the reduced-reflection wavelength regions incident on the optical components without such a layer, wherein the reduced-reflection wavelength regions are the visible ("VIS") wavelength region up to approximately 650 nm, the i line at $\lambda=365$ nm and the deep ultraviolet ("DUV") wavelength region at 240 to 270 nm,
   wherein the reflection-reducing layer has a sandwich structure which comprises the materials:
   M2,
   and $MgF_2$;
   wherein the sandwich structure comprises a plurality of layers of M2 and $MgF_2$ being applied alternately and the final layer comprising $MgF_2$; and
   wherein M2 is a mixed substance comprising $La_2O_3.3.3$ $Al_2O_3$.

4. The reflection-reducing layer as claimed in claim 3, wherein the reflection-reducing layer is designed for optical components made from quartz glass or from $CaF_2$ and has a structure corresponding to Table F below, where layer 1 is the bottom layer:

TABLE F

| Layer No. | Approximate Thickness in nm | Material |
|---|---|---|
| 1 | 14.56 | M2 |
| 2 | 15.38 | $MgF_2$ |
| 3 | 19.55 | M2 |
| 4 | 10.64 | $MgF_2$ |
| 5 | 87.07 | M2 |
| 6 | 22.38 | $MgF_2$ |
| 7 | 21.89 | M2 |
| 8 | 123.66 | $MgF_2$ |
| 9 | 17.88 | M2 |
| 10 | 26.19 | $MgF_2$ |
| 11 | 68.93 | M2 |
| 12 | 12.7 | $MgF_2$ |
| 13 | 16.16 | M2 |
| 14 | 66.19 | $MgF_2$ |

5. The use of the reflection-reducing layer as claimed in claim 4, wherein the reflection from optical components made from either quartz glass or $CaF_2$ is reduced by application of the reflection-reducing layer.

6. A reflection-reducing layer for a plurality of wavelength regions, wherein the reflection-reducing layer is configured to reduce an amount of reflection of light at specific reduced-reflection wavelength regions incident on optical components relative to an amount of reflection of light at the reduced-reflection wavelength regions incident on the optical components without such a layer, wherein the reduced-reflection wavelength regions are the visible ("VIS") wavelength region up to approximately 650 nm, the i line at $\lambda=365$ nm and the deep ultraviolet ("DUV") wavelength region at 240 to 270 nm,
   wherein the reflection-reducing layer has a sandwich structure which comprises the materials:
   M2,
   $MgF_2$,
   and $Al_2O_3$;
   wherein the sandwich structure comprises a plurality of layers comprising $Al_2O_3$ and $MgF_2$ being applied alternately in the lower part of the sandwich structure and a plurality of layers comprising M2 and $MgF_2$ being applied alternately in the upper part of the sandwich structure, and with the final layer comprising $MgF_2$; and
   wherein M2 is a mixed substance comprising $La_2O_3.3.3$ $Al_2O_3$.

7. The reflection-reducing layer as claimed in claim 6, wherein the reflection-reducing layer has only a single layer of $Al_2O_3$.

8. The reflection-reducing layer as claimed in claim 6, wherein the reflection-reducing layer is designed for optical components made from quartz glass or from $CaF_2$ and has a structure as shown in Table E below, with layer 1 being the bottom layer:

TABLE E

| Layer No. | Approximate Thickness in nm | Material |
|---|---|---|
| 1 | 136.17 | $Al_2O_3$ |
| 2 | 175 | $MgF_2$ |
| 3 | 24.26 | M2 |
| 4 | 26.85 | $MgF_2$ |
| 5 | 14.66 | M2 |
| 6 | 77.29 | $MgF_2$. |

9. An inspection microscope for a plurality of wavelength regions composing:
   at least one illumination beam path and
   at least one imaging beam path;
   wherein optical components in the illumination beam path and in the imaging beam path through which beams of all wavelength regions pass are covered with a reflection-reducing layer,
   wherein the reflection-reducing layer reduces an amount of reflection of light at specific reduced-reflection wavelength regions incident on the optical components relative to an amount of reflection of light at the reduced-reflection wavelength regions incident on the optical components without such a layer,
   wherein the reduced-reflection wavelength regions are the visible ("VIS") wavelength region up to approximately 650 nm, the i line at $\lambda=365$ nm and the deep ultraviolet ("DUV") wavelength region from 240 nm to 270 nm, and
   wherein the reflection-reducing layer has a sandwich structure which comprises $La_2O_3 \cdot 3.3\ Al_2O_3$ and $MgF_2$.

10. The inspection microscope as claimed in claim 9, wherein the reflection-reducing layer has a sandwich structure which comprises the materials:
   M2,
   $MgF_2$, and
   $SiO_2$;
   wherein the sandwich structure comprises a plurality of layers of M2 and $SiO_2$ being applied alternately in the lower part of the sandwich structure and a plurality of layers of M2 and $MgF_2$ being applied alternately in the upper part of the sandwich structure, and with the final layer comprising $MgF_2$; and
   wherein M2 is a mixed substance comprising $La_2O_3 \cdot 3.3\ Al_2O_3$.

11. The inspection microscope as claimed in claim 10, wherein at the reflection-reducing layer the mean reflection value for the VIS wavelength region and the i line is $\leq 1.0\%$ and the mean reflection value for the DUV wavelength region is $\leq 0.5\%$.

12. The inspection microscope as claimed in claim 9, wherein the optical components covered with the reflection-reducing layer comprise quartz glass or $CaF_2$ and have a uniform reflection-reducing layer.

13. The inspection microscope as claimed in claim 9, wherein one or more component changers having at least two wavelength region-specific optical components for optionally introducing in each case at least one of these components into the illumination beam path and the imaging beam path are arranged in the associated beam path.

14. A reflection-reducing layer for a plurality of wavelength regions, wherein the reflection-reducing layer is configured to reduce an amount of reflection of light at specific reduced-reflection wavelength regions incident on optical components relative to an amount of reflection of light at the reduced-reflection wavelength regions incident on the optical components without such a layer, wherein the reduced-reflection wavelength regions are the visible ("VIS") wavelength region up to approximately 650 nm, the i line at $\lambda=365$ nm and the deep ultraviolet ("DUV") wavelength region at 240 to 270 nm, and wherein the reflection-reducing layer has a sandwich structure which comprises $La_2O_3 \cdot 3.3\ Al_2O_3$ and $MgF_2$.

15. The reflection-reducing layer as claimed in claim 14, wherein the reflection-reducing layer is designed for optical components made from quartz glass or from $CaF_2$.

16. The reflection-reducing layer as claimed in claim 14, wherein the reflection-reducing layer has a sandwich structure which comprises the materials:
   M2,
   $MgF_2$,
   and $SiO_2$;
   wherein the sandwich structure comprises a plurality of layers comprising M2 and $SiO_2$ being applied alternately in the lower part of the sandwich structure and a plurality of layers comprising M2 and $MgF_2$ being applied alternately in the upper part of the sandwich structure, and with the final layer comprising $MgF_2$; and
   wherein M2 is a mixed substance comprising $La_2O_3 \cdot 3.3\ Al_2O_3$.

17. The reflection-reducing layer as claimed in claim 16, wherein the reflection-reducing layer has at least three layers of $SiO_2$ and at least three layers of $MgF_2$.

18. The reflection-reducing layer as claimed in claim 16, wherein the mean reflection value for the VIS wavelength region and the i line is $\leq 1.0\%$ and the mean reflection value for the DUV wavelength region is $\leq 0.5\%$.

19. The reflection-reducing layer as claimed in claim 18, wherein the reflection-reducing layer is designed for optical components made from quartz glass or from $CaF_2$ and has a structure corresponding to Table A below, where layer 1 is the bottom layer:

TABLE A

| Layer No. | Approximate Thickness in nm | Material |
|---|---|---|
| 1 | 14.9 | M2 |
| 2 | 25.57 | $SiO_2$ |
| 3 | 20.72 | M2 |
| 4 | 10.12 | $SiO_2$ |
| 5 | 66.94 | M2 |
| 6 | 9.17 | $SiO_2$ |
| 7 | 6.07 | M2 |
| 8 | 14.44 | $SiO_2$ |
| 9 | 21.87 | M2 |
| 10 | 110.66 | $SiO_2$ |
| 11 | 21.78 | M2 |
| 12 | 20.16 | $MgF_2$ |
| 13 | 70.39 | M2 |
| 14 | 14.05 | $MgF_2$ |
| 15 | 15.58 | M2 |
| 16 | 66.86 | $MgF_2$. |

20. The reflection-reducing layer as claimed in claim 18, wherein the reflection-reducing layer is designed for optical components made from quartz glass or from $CaF_2$ and has a structure as given in Table B below, where layer 1 is the bottom layer:

TABLE B

| Layer No. | Approximate Thickness in nm | Material |
|---|---|---|
| 1 | 13.95 | M2 |
| 2 | 27.60 | $SiO_2$ |
| 3 | 20.66 | M2 |
| 4 | 8.84 | $SiO_2$ |
| 5 | 69.42 | M2 |
| 6 | 20.90 | $SiO_2$ |
| 7 | 24.61 | M2 |
| 8 | 112.60 | $SiO_2$ |
| 9 | 21.02 | M2 |
| 10 | 20.60 | $MgF_2$ |
| 11 | 69.85 | M2 |
| 12 | 13.97 | $MgF_2$ |
| 13 | 16.01 | M2 |
| 14 | 66.65 | $MgF_2$. |

21. The reflection-reducing layer as claimed in claim 16, wherein the reflection-reducing layer is designed for optical components made from quartz glass or from $CaF_2$ and has a structure as given in Table C below, where layer 1 is the bottom layer:

TABLE C

| Layer No. | Approximate Thickness in nm | Material |
|---|---|---|
| 1 | 15.71 | M2 |
| 2 | 21.57 | $SiO_2$ |
| 3 | 96.82 | M2 |
| 4 | 20.75 | $SiO_2$ |
| 5 | 25.35 | M2 |
| 6 | 114.91 | $SiO_2$ |

TABLE C-continued

| Layer No. | Approximate Thickness in nm | Material |
|---|---|---|
| 7 | 19.29 | M2 |
| 8 | 20.47 | $MgF_2$ |
| 9 | 67.52 | M2 |
| 10 | 14.19 | $MgF_2$ |
| 11 | 17.22 | M2 |
| 12 | 65.82 | $MgF_2$. |

22. The reflection-reducing layer as claimed in claim 16, wherein the reflection-reducing layer is designed for optical components made from quartz glass or from $CaF_2$ and has a structure as given in Table D below, where layer 1 is the bottom layer:

TABLE D

| Layer No. | Approximate Thickness in nm | Material |
|---|---|---|
| 1 | 7.08 | M2 |
| 2 | 28.54 | $SiO_2$ |
| 3 | 18.90 | M2 |
| 4 | 11.79 | $SiO_2$ |
| 5 | 99.82 | M2 |
| 6 | 15.97 | $SiO_2$ |
| 7 | 15.98 | M2 |
| 8 | 126.92 | $SiO_2$ |
| 9 | 19.24 | M2 |
| 10 | 12.55 | $MgF_2$ |
| 11 | 63.48 | M2 |
| 12 | 8.65 | $MgF_2$ |
| 13 | 25.04 | M2 |
| 14 | 65.56 | $MgF_2$. |

* * * * *